United States Patent
Cho et al.

(10) Patent No.: US 12,326,363 B2
(45) Date of Patent: Jun. 10, 2025

(54) SPECTROSCOPE

(71) Applicant: ANSWERAY INC., Gwacheon-si (KR)

(72) Inventors: Seong Ho Cho, Gwacheon-si (KR); Gajendra Pratap Singh, Nagar (IN)

(73) Assignee: ANSWERAY INC., Gwacheon-si (KR)

( * ) Notice: Subject to any disclaimer, the term of this patent is extended or adjusted under 35 U.S.C. 154(b) by 163 days.

(21) Appl. No.: 18/018,674

(22) PCT Filed: Jul. 30, 2021

(86) PCT No.: PCT/KR2021/010022
§ 371 (c)(1),
(2) Date: Jan. 30, 2023

(87) PCT Pub. No.: WO2022/025728
PCT Pub. Date: Feb. 3, 2022

(65) Prior Publication Data
US 2023/0296435 A1    Sep. 21, 2023

(30) Foreign Application Priority Data

Jul. 30, 2020 (KR) .................. 10-2020-0095321

(51) Int. Cl.
*G01J 3/02* (2006.01)
*G01J 3/12* (2006.01)

(52) U.S. Cl.
CPC ............ *G01J 3/027* (2013.01); *G01J 3/0208* (2013.01); *G01J 3/0275* (2013.01);
(Continued)

(58) Field of Classification Search
CPC ........ G01J 3/027; G01J 3/0208; G01J 3/0275; G01J 2003/1204; G01J 2003/123;
(Continued)

(56) References Cited

U.S. PATENT DOCUMENTS

2005/0111233 A1 * 5/2005 Vezard ...................... F21V 9/40
  362/552
2013/0016344 A1 * 1/2013 Bullock .................. G01J 3/027
  356/217

(Continued)

FOREIGN PATENT DOCUMENTS

JP    2010-286346 A    12/2010
JP    2011169642 A *   9/2011
(Continued)

OTHER PUBLICATIONS

English Translation of Chiba et al. JP6257926B2 Description (Year: 2018).*

(Continued)

*Primary Examiner* — Tarifur R Chowdhury
*Assistant Examiner* — Akbar H. Rizvi
(74) *Attorney, Agent, or Firm* — Stein IP, LLC

(57) ABSTRACT

Proposed is a spectroscope including a disperser configured to disperse incident signal light, wherein the disperser includes a bandpass filter configured to spectroscopically process the signal light by pivoting according to a driving signal and a light-receiving element configured to receive the signal light spectroscopically processed by bands and output a corresponding electrical signal.

16 Claims, 5 Drawing Sheets

(52) U.S. Cl.
CPC . *G01J 2003/1204* (2013.01); *G01J 2003/123* (2013.01); *G01J 2003/1243* (2013.01)

(58) Field of Classification Search
CPC .... G01J 2003/1243; G01J 3/06; G01J 3/2803; G01J 3/32; G01J 3/1804; G02B 26/00; G02B 27/30; G02B 27/42; G02B 26/002
See application file for complete search history.

(56) References Cited

U.S. PATENT DOCUMENTS

| | | | |
|---|---|---|---|
| 2013/0128268 A1* | 5/2013 | Tomioka | G01J 3/0237 356/328 |
| 2018/0172511 A1* | 6/2018 | Margalit | G01J 3/10 |
| 2018/0226773 A1* | 8/2018 | Yun | G01B 9/02084 |
| 2020/0149964 A1 | 5/2020 | Kobayashi | |

FOREIGN PATENT DOCUMENTS

| | | |
|---|---|---|
| JP | 5584488 B2 | 9/2014 |
| JP | 5945400 B2 | 7/2016 |
| JP | 2016-205889 A | 12/2016 |
| JP | 6257926 B2 * | 1/2018 |
| KR | 10-1619143 B1 | 5/2016 |

OTHER PUBLICATIONS

English Translation of Okura JP2011169642A Description (Year: 2011).*
International Search Report mailed Nov. 25, 2021, issued to corresponding International Application No. PCT/KR2021/010022.

* cited by examiner

SPECTROSCOPE

CROSS-REFERENCE TO RELATED APPLICATIONS

This application is a national stage of International Application No. PCT/KR2021/010022, filed Jul. 30, 2021, which claims the benefit of Korean Application No. 10-2020-0095321, filed Jul. 30, 2020, in the Korean Intellectual Property Office, the disclosures of which are incorporated herein by reference.

TECHNICAL FIELD

The present technology relates to a spectroscope.

BACKGROUND ART

A spectroscope refers to a device that decomposes light, that is, electromagnetic waves, which a target material has absorbed or emitted according to a difference in wavelength as well as measures an intensity distribution for each wavelength. The spectroscope uses a diffraction grating, a prism, an interferometer, a filter, or the like in order to disperse electromagnetic waves for each wavelength.

The spectroscope is largely divided into two methods, a light-receiving method of all spectral wavelengths at once using imaging devices such as a charged coupled device (CCD), a CMOS image sensor (CIS), and the like and a light-receiving method of a specific or partial wavelength at a time using photodiodes arranged in an individual or array. In the light-receiving method of only a specific wavelength or partial wavelength, an entire spectrum may be read by performing scanning.

The spectroscope, which uses the light-receiving method of all spectral wavelengths at once, has an advantage in that it is convenient because all optical devices are fixed and able to read all wavelengths at once but has disadvantages in that it requires CCD or CIS with a large number of pixels and is complicated and expensive.

The spectroscope, which uses the light-receiving method of only a specific wavelength or partial wavelength, and converts the light, which a photodiode has received into an electrical signal, has advantages in that it is simple and inexpensive and is capable of adjusting wavelength resolution or sensitivity by adjusting size and scanning time of a dispersion device such as a diffraction grating, but has a disadvantage in that it requires mechanical movement.

DISCLOSURE

Technical Problem

Accordingly, the present disclosure has been made keeping in mind the above problems occurring in the related art. A spectroscope according to conventional art performs low-temperature cooling and the like in order to reduce thermal noise and thus to improve a signal-to-noise ratio, so an additional device for this is required and a configuration is complicated and expensive.

One of the problems to be resolved by the present technology is to solve the above-mentioned difficulties of the conventional art. That is, one of the problems to be solved by the present technology is to provide a spectroscope capable of improving measurement sensitivity by achieving a high signal-to-noise ratio.

Technical Solution

In order to accomplish the above objective, there may be provided a spectroscope according to a present embodiment including a disperser configured to disperse incident signal light, wherein the disperser includes: a bandpass filter configured to spectroscopically process the signal light by bands, by pivoting according to a driving signal; and a light-receiving element configured to receive the signal light spectroscopically processed by bands to output a corresponding electrical signal.

According to any aspect of the present embodiment, the spectroscope may further include a mixer configured to receive the electrical signal and the driving signal and mix the electrical signal and the driving signal; and an electrical filter configured to output a signal of a target band from a signal output from the mixer.

According to any aspect of the present embodiment, the spectroscope may further include a collimator configured to allow the signal light to be collimated and provided to the disperser.

According to any aspect of the present embodiment, the spectroscope may further include an amplifier configured to allow the electrical signal to be amplified and provided to a mixer.

According to any aspect of the present embodiment, the light-receiving element comprises one or more photodiodes arranged in an array or in a row.

According to any aspect of the present embodiment, the bandpass filter may be an interference filter coated with materials having different refractive indices a plurality of times and may be configured to allow light in a preset band to be penetrated by interference.

According to any aspect of the present embodiment, the bandpass filter may perform pivotal movement on one of a y-axis and a z-axis perpendicular to an x-axis, which is an optical axis of the signal light, as a pivot axis.

According to any aspect of the present embodiment, as a pivoting angle of the bandpass filter increases, a wavelength of light output from the bandpass filter may decrease.

According to any aspect of the present embodiment, as the bandpass filter pivots, the bandpass filter may be configured to output light dispersed by bands of the signal light, and the light-receiving element may be configured to receive dispersed light.

There may be provided a spectroscope according to a present embodiment including a disperser configured to disperse incident signal light, wherein the disperser includes: a diffraction grating configured to spectroscopically process the signal light by bands, by pivoting according to a driving signal; and a light-receiving element configured to receive the signal light spectroscopically processed by bands to output a corresponding electrical signal.

In one aspect of the present spectroscope embodiment, the spectroscope may further include a mixer configured to receive the electrical signal and the driving signal and mix the electrical signal and the driving signal; and an electrical filter configured to output a signal of a target band from a signal output from the mixer.

According to any aspect of the present embodiment, the spectroscope may further include a collimator configured to allow the signal light to be collimated and provided to the disperser.

According to any aspect of the present embodiment, the spectroscope may further include an amplifier configured to allow the electrical signal to be amplified and provided to a mixer.

According to any aspect of the present embodiment, the light-receiving element may include one or more photodiodes arranged in an array.

According to any aspect of the present embodiment, the diffraction grating may include a plurality of grating patterns provided in any one direction.

According to any aspect of the present embodiment, the disperser may be configured to disperse and output light of all bands included in the signal light.

According to any aspect of the present embodiment, the light-receiving element may be configured to receive dispersed light.

According to any aspect of the present embodiment, the diffraction grating may be configured to perform pivotal movement on one of a y-axis and a z-axis perpendicular to an x-axis, which is an optical axis of the signal light, as a pivot axis.

Advantageous Effects

As described above, the spectroscope of the present embodiment provides advantages in that a high signal-to-noise ratio can be obtained, and compared to the conventional art, high measurement sensitivity can be obtained.

MODE FOR INVENTION

Figure 1:
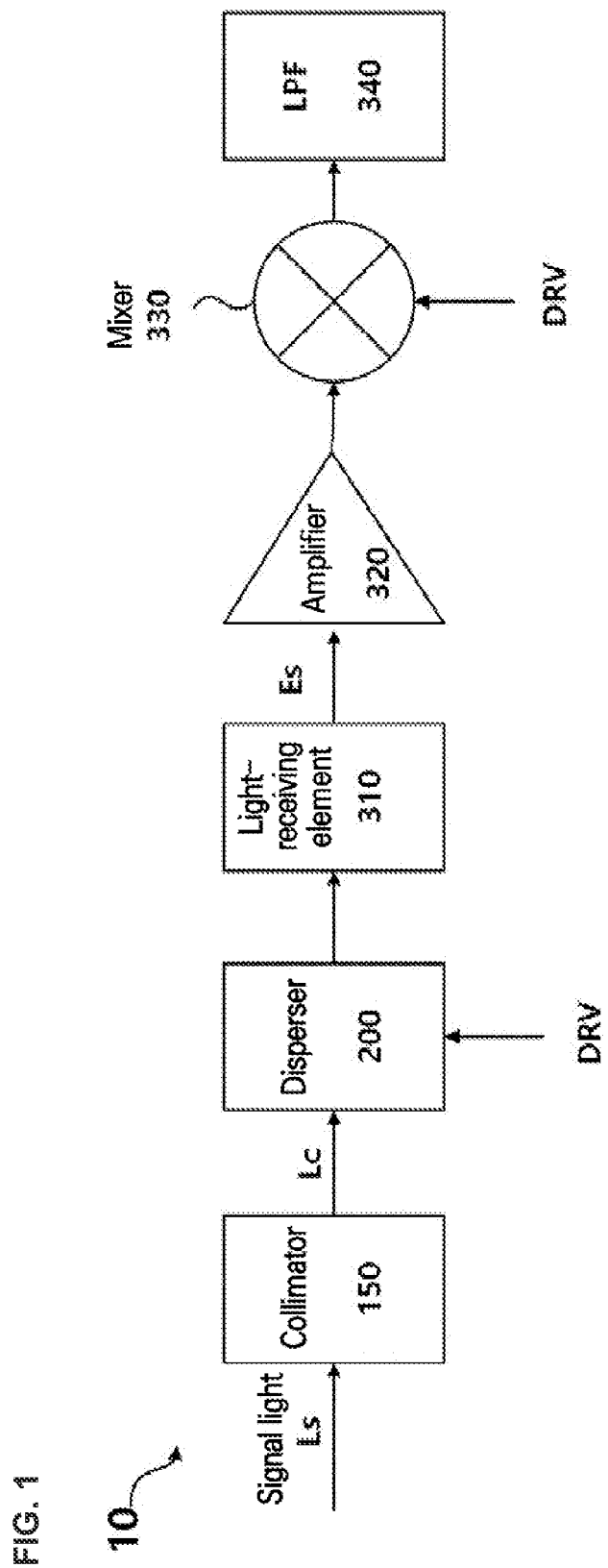
FIG. 1 is a schematic block diagram of a spectrometer 1 according to a present embodiment.

The description of the present disclosure is only an embodiment for structural or functional description, so a scope of the present disclosure should not be construed as being limited by the embodiments described in the text. That is, the embodiments may be changed and have various forms, so it should be understood that the scope of the present disclosure includes equivalents capable of realizing the technical idea.

Meanwhile, meaning of terms described in the present application should be understood as in the followings.

Singular expressions are to be understood to include plural expressions unless the context clearly dictates otherwise. In addition, it should be understood that a term "comprise" or "have" is intended to designate that a feature, a number, a step, an operation, an element, a part, or combination thereof, which is described, exists, but the possibility of the presence of one or more other features, numbers, steps, operations, elements, parts, or combinations thereof is not precluded.

Each step may occur in a different order than a specified order unless a specific order is clearly stated in the context. That is, each step may occur in the same order as specified, may be performed substantially simultaneously, or may be performed in a reverse order.

Drawings referred to describe the embodiments of the present disclosure are intentionally exaggerated in size, height, thickness, and the like for convenience of description and ease of understanding, and are not enlarged or reduced in proportion. In addition, some elements shown in the drawings may be intentionally expressed by being reduced, and other elements may be intentionally expressed by being enlarged.

All terms used herein have the same meaning as commonly understood by one of ordinary skill in the art to which the present disclosure belongs, unless defined otherwise. Terms such as those defined in commonly used dictionaries should be interpreted as consistent with the meaning in the context of the related art, and may not be interpreted as having an ideal or excessively formal meaning unless explicitly defined in the present application.

Hereinafter, the present embodiment will be described with reference to the accompanying drawings. FIG. 1 is a schematic block diagram of a spectrometer 1 according to a present embodiment. With reference to FIG. 1, the spectroscope 10 includes a disperser 200 configured to disperse incident signal light Ls, wherein the disperser includes: a bandpass filter configured to spectroscopically process the signal light by bands, by pivoting according to a driving signal DRV; and a light-receiving element 310 configured to receive the signal light spectroscopically processed by bands to output a corresponding electrical signal Es.

As one embodiment, the signal light Ls is analysis target light and may be light provided from a light source (not shown). As another embodiment, the signal light Ls may be Raman scattered light provided by Raman scattering. As still another embodiment, the signal light Ls may be light including an absorption spectrum formed and provided by absorbing a specific frequency component. As still another embodiment, the signal light Ls may be light in which an optical change such as absorption of a frequency component or shift in a frequency component occurs due to reflection. However, a type of the signal light Ls described above is only an example and does not limit the scope of the present disclosure. The spectroscope 10 of the present embodiment receives the signal light Ls, spectroscopically processes it, and outputs an electrical signal Es corresponding to the signal light.

The signal light Ls is provided to a collimator 150, converted into collimated signal light Lc that is parallel light, and provided to the disperser 200.

Figure 2:
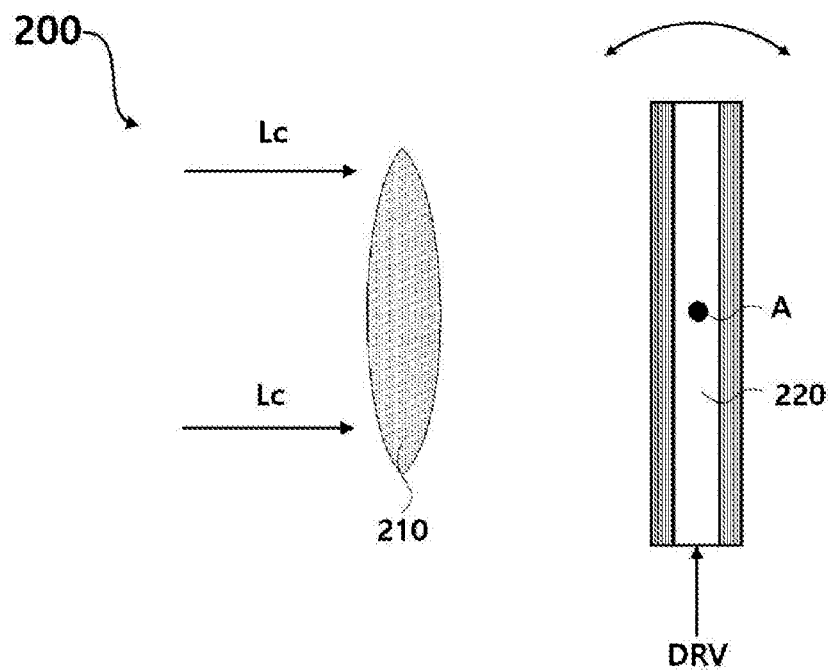
FIG. 2 is a view schematically showing a configuration of a disperser 200.

FIG. 2 is a view schematically showing a configuration of a disperser 200. With reference to FIG. 2, the disperser 200 includes an optical system 210 including a condensing lens or a condensing mirror configured to condense the collimated signal light Lc provided by the collimator 150 and a dispersion element configured to receive the driving signal DRV and pivot at a corresponding angle. In the embodiment illustrated by FIG. 2, the dispersion element is a bandpass filter 220. Although not shown, a driving signal is provided to the dispersion element, and the dispersion element may include a driving unit configured to perform pivotal movement of the dispersion element with respect to a pivot axis in response to the driving signal.

The bandpass filter 220 is coated with materials having different refractive indices a plurality of times. The bandpass filter 220 having such a configuration is an interference-type band pass filter that allows light in a preset band to be penetrated and light other than the light in a preset band to be extinct through interference with each other.

The bandpass filter 220 pivots on the basis of a pivot axis A to correspond to the provided driving signal DRV. As an example, when the optical axis of the collimated signal light is an x-axis, the pivot axis may be either a y-axis or a z-axis perpendicular to the x-axis.

In the illustrated example, the pivot axis A may be a straight line including a point where the optical axis of the collimated signal light Lc meets the bandpass filter 220 and may be a straight line perpendicular to the optical axis of the collimated signal light Lc. In an example not shown, the pivot axis A may be a straight line perpendicular to the optical axis of the collimated signal light Lc, as a straight line including a point at one end of the bandpass filter 220, or a straight line perpendicular to the optical axis of the collimated signal light Lc, as a straight line including any point outside the bandpass filter 220. The bandpass filter 220 pivots back and forth to the sides of the optical axis of the signal light Lc about the pivot axis A.

As one embodiment, the driving signal DRV may be a sinusoidal wave or a square wave having a preset frequency and amplitude.

The bandpass filter 220 may perform a pivoting motion according to the driving signal DRV. In one embodiment, when the driving signal DRV is a sinusoidal wave, the bandpass filter 220 is put to be in lock-in to the frequency of the driving signal DRV and pivots. In another embodiment, when the driving signal is a square wave, the bandpass filter 220 may count the number of square wave pulses included in the driving signal and pivot to correspond to a counting result. The light-receiving element 310 is configured to receive various wavelength components that the bandpass filter 220 has provided while pivoting.

Figure 3:
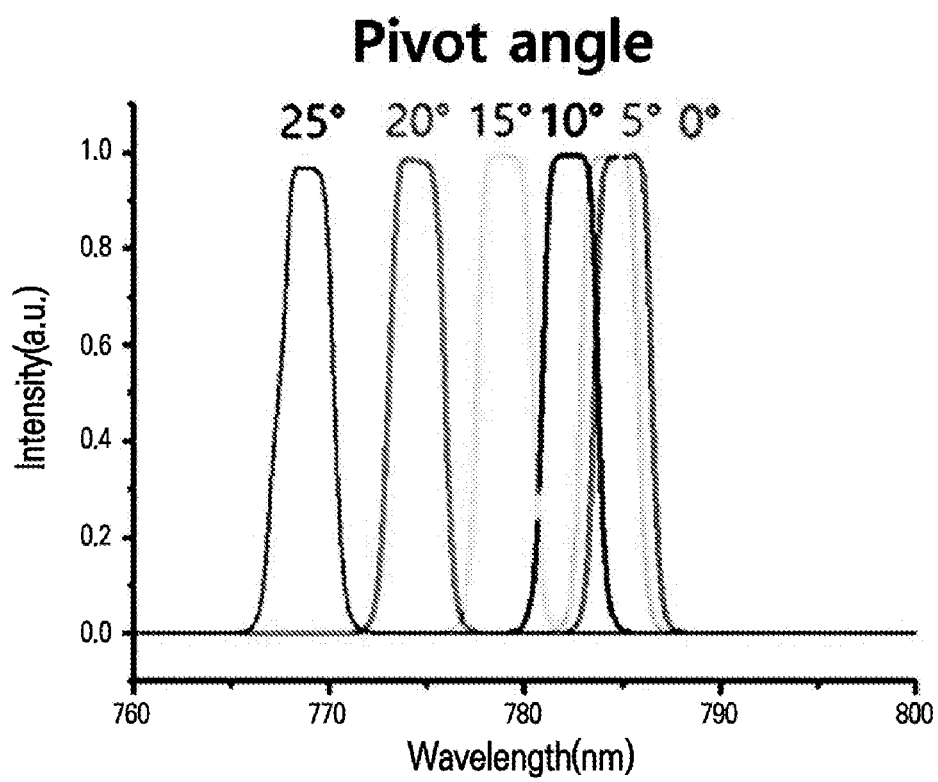
FIG. 3 is a graph showing characteristics of penetrated light when a bandpass filter 220 pivots.

FIG. 3 is a graph showing characteristics of penetrated light when a bandpass filter 220 pivots. In FIG. 3, in the case in which the bandpass filter 220 is pivoted up to 5°, 10°, . . ., 25° in a state for which the bandpass filter 220 is vertically arranged with respect to the optical axis of the collimated signal light Lc, the wavelength of the light that the bandpass filter 220 outputs is shown. As shown in FIG. 3, it may be seen that as a pivoting angle of the bandpass filter 220 increases, the wavelength of light having been penetrated through the bandpass filter 220 decreases.

Figure 4A:
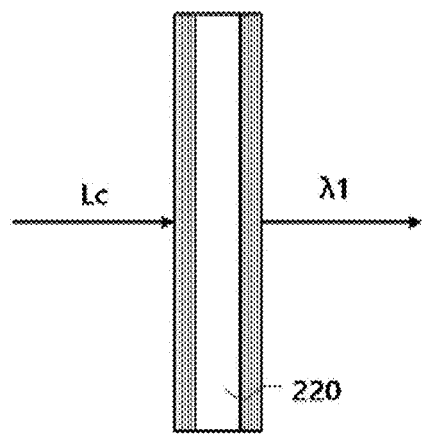
FIGS. 4A to 4C are views each showing an input/output relationship of the light when the bandpass filter 220 pivots on the basis of a result of FIG. 3.
Figure 4B:
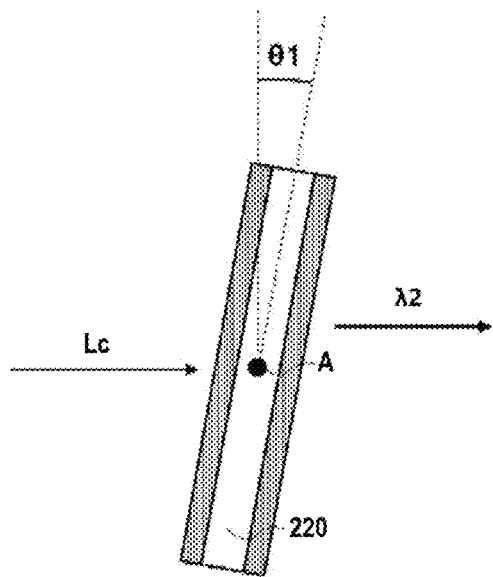
Figure 4C:
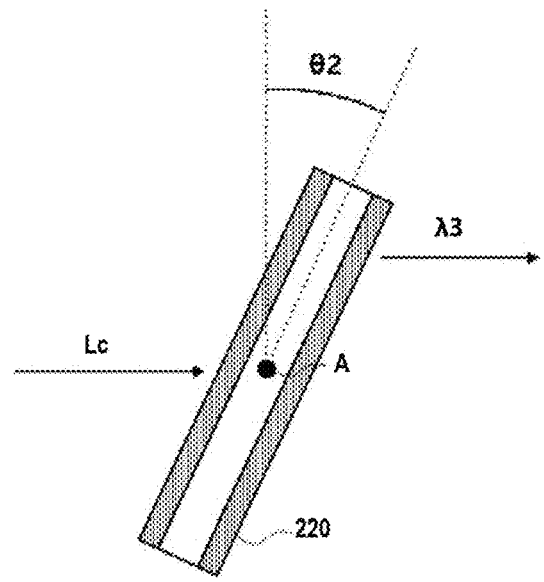

FIGS. 4A to 4C are views each showing an input/output relationship of the light when the bandpass filter 220 pivots on the basis of a result of FIG. 3. With reference to FIG. 4A, when the bandpass filter 220 does not pivot or the pivoting angle is small, the bandpass filter 220 passes light A1 of a predetermined band in the collimated signal light. However, as the pivoting angle increases as in FIG. 4B, the bandpass filter 220 passes light \2 having a shorter wavelength (higher frequency) than the band of the light passed in FIG. 4A. Furthermore, as the pivoting angle of the bandpass filter 220 increases, the optical axis of the light passed due to the difference between the refractive index of the bandpass filter and the refractive index of air shifts from the optical axis of the collimated signal light Lc.

As the pivoting angle of the bandpass filter 220 further increases as shown in FIG. 4C, the bandpass filter 220 passes light A3 having a shorter wavelength (higher frequency) than the band of the light passed in the case as illustrated in FIG. 4B. Furthermore, the optical axis of the light passed in the state in which the bandpass filter 220 is pivoted is further shifted from the optical axis of the light passed as in the case illustrated in FIG. 4B.

Figure 5:
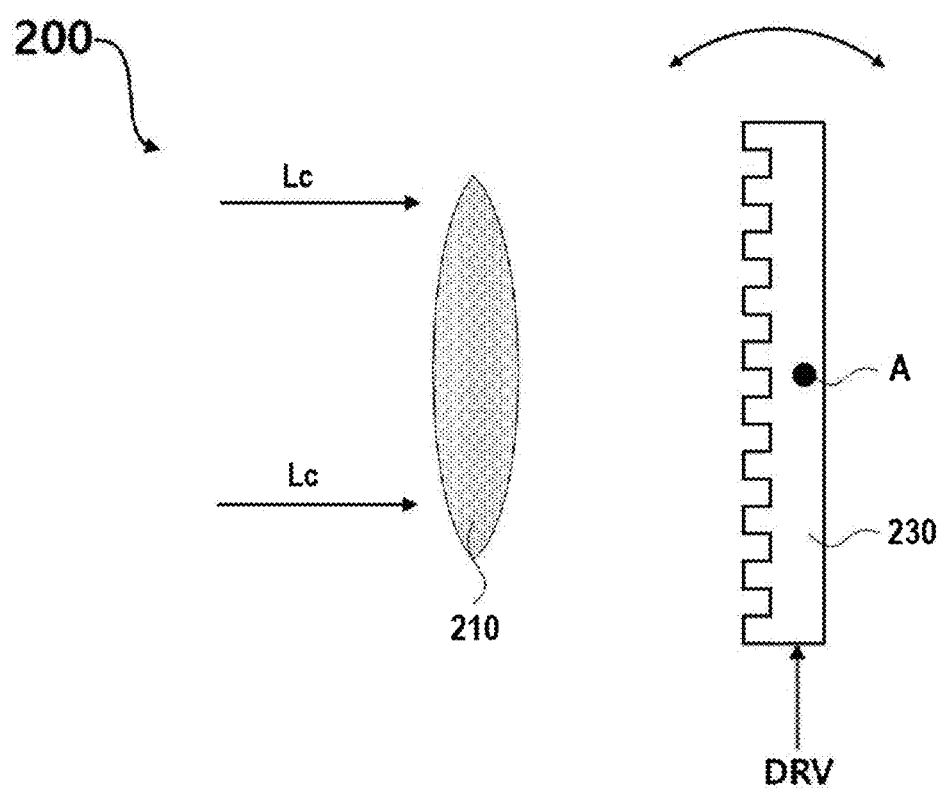
FIG. 5 is a diagram schematically showing a configuration of a disperser 200 according to another embodiment.

FIG. 5 is a diagram schematically showing a configuration of a disperser 200 according to another embodiment. However, descriptions of elements, the same as or similar to the elements in the embodiment illustrated in FIG. 5 and the embodiment previously described, may be omitted. With reference to FIG. 5, the disperser 200 includes an optical system 210 including a condensing lens or a condensing mirror configured to condense the collimated signal light Lc provided by the collimator 150 and a dispersion element configured to receive a driving signal DRV and pivot at a corresponding angle. In the embodiment as illustrated in FIG. 5, the dispersion element is a diffraction grating 230 configured to spectroscopically process the collimated signal light Lc and provide spectroscopically processed light. The diffraction grating 230 is configured to disperse all bands included in the signal light and provide dispersed light.

The diffraction grating 230 includes a plurality of grating patterns provided in one direction. The pivot axis A which the diffraction grating 230 pivots on the basis thereof includes a point where the collimated signal light Lc meets the diffraction grating and may be a straight line parallel to a direction in which the grating pattern is provided.

In an example not shown, the pivot axis A may be a straight line perpendicular to the optical axis of the collimated signal light Lc, as a straight line including a point at one end of the diffraction grating 230, or a straight line perpendicular to the optical axis of the collimated signal light Lc, as a straight line including any point outside the diffraction grating 230. The diffraction grating 230 pivots back and forth to the sides of the optical axis of the signal light Lc about the pivot axis A.

As one embodiment, the driving signal DRV may be a sinusoidal wave or a square wave having a preset frequency and amplitude. The diffraction grating 230 may perform a pivoting motion according to amplitude and/or frequency of the driving signal DRV. In one embodiment, when the driving signal DRV is a sinusoidal wave, the diffraction grating 230 is put to be in lock-in to the frequency of the driving signal DRV and pivots. In another embodiment, when the driving signal is a square wave, the diffraction grating 230 may count the number of square wave pulses included in the driving signal and pivot to correspond to a counting result. The light-receiving element 310 is configured to receive various wavelength components that the diffraction grating 230 has provided while pivoting.

In one embodiment, the light-receiving element 310 may include one or more photodiodes arranged in a row or in an array type and, for example, may be combined with a cooling device (not shown) in order to reduce thermal noise.

Figure 6A:
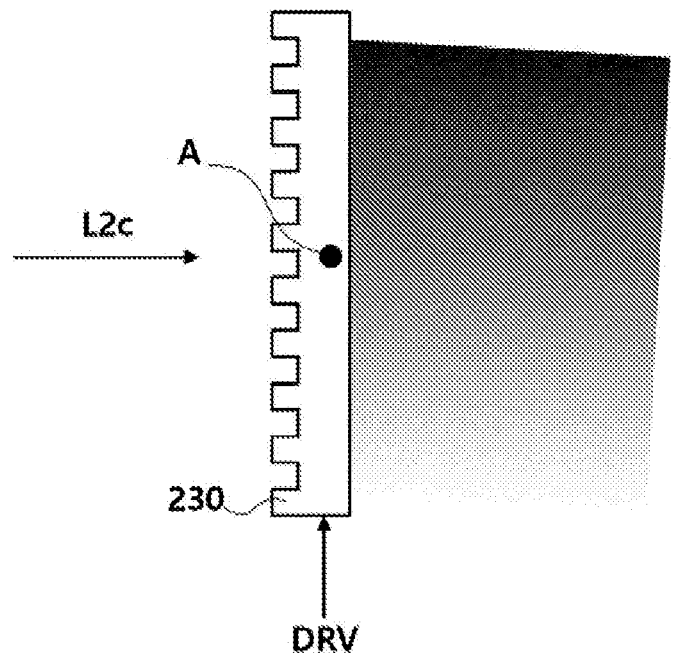
FIGS. 6A and 6B are views each showing light when a diffraction grating 230 pivots.
Figure 6B:
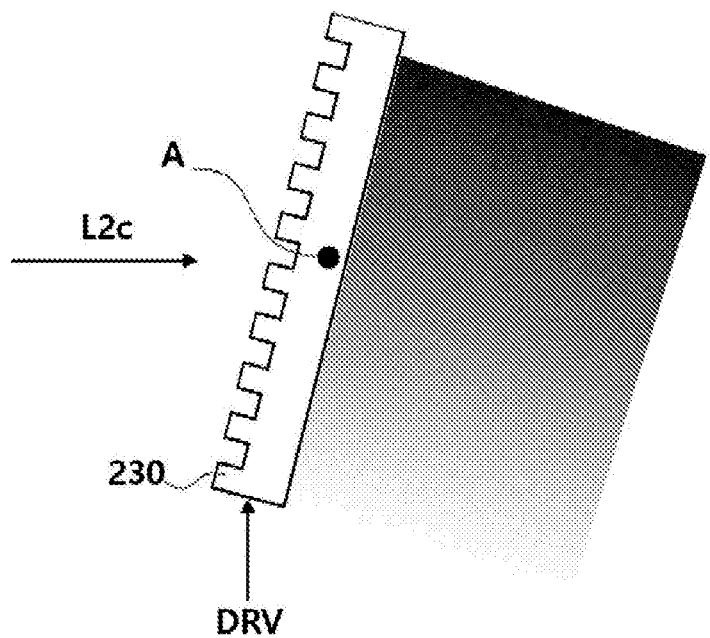

FIGS. 6A and 6B are views each showing light when the diffraction grating 230 pivots. With reference to FIGS. 6A and 6B, in a state in which the light-receiving element 310 is fixed, the light-receiving element 310 is configured to receive wavelengths different from each other as the diffraction grating pivots and to output an electrical signal Es corresponding to the received light.

Accordingly, when light of a specific wavelength band is to be received, the light-receiving element 310 may be disposed at a position of a wavelength band, which the diffraction grating 230 disperses the light to provide when pivoting. In another embodiment, the light-receiving element 310 (see FIG. 1) may have a size capable of receiving all light that the diffraction grating 230 provides by transmitting.

The embodiment shown in FIG. 5 and FIGS. 6A and 6B illustrates a transmission type diffraction grating, but in another embodiment not shown, the disperser includes a reflection type diffraction grating.

With reference back to FIG. 1, the light-receiving element 310 provides an electrical signal Es corresponding to the received light and provides the signal Es to the amplifier 320. The amplifier 320 amplifies the provided signal with a predetermined gain and outputs the signal to a mixer 330.

The mixer 330 performs a down-conversion of the signal output from the amplifier 320 using the driving signal DRV. For example, when the frequency of the signal output by the amplifier 320 is $f_1$ and the frequency of the drive signal DRV is $f_{DRV}$, the output signal OUT of the mixer may be expressed as in Equation 1 below.

$$OUT = A\sin(2\pi f_1 t) \times B\sin(2\pi f_{DRV} t) \qquad \text{[Equation 1]}$$
$$= \frac{AB}{2}(\sin 2\pi (f_1 - f_{DRV})t + \sin(2\pi (f_1 + f_{DRV})t)$$

That is, the output signal OUT of the mixer 330 may be expressed as a sum of a signal having a frequency component corresponding to a frequency difference between the output signal of the amplifier 320 and the driving signal and a signal having a frequency component corresponding to a sum of the frequencies of the output signal of the amplifier 320 and the driving signal.

When an electrical filter such as a low pass filter (LPF) 340 is used, it is possible to block a signal component, which has a frequency component corresponding to the sum of the frequencies of the output signal of the amplifier 320 and the driving signal, and to obtain a signal component corresponding to the frequency difference between the output signal of the amplifier 320 and the driving signal.

The signal output from the filter is an electrical signal corresponding to the signal light and has a high signal-to-noise ratio.

In this way, when the dispersion element is moved by pivoting by being modulated with the driving signal (DRV) having a specific frequency and is subjected to down-conversion by the mixer using the spectral signal and the driving signal, there may be provided an advantage in that a spectral signal having a high signal-to-noise ratio may be obtained.

Although it has been described with reference to the embodiments shown in the drawings to aid understanding of the present disclosure, this is an embodiment for implementation and is only exemplary, and it will be appreciated that those having ordinary knowledge of the art may make various modifications and equivalent other embodiments therefrom. Therefore, the true technical scope of protection of the present disclosure will be defined by the appended claims.

The invention claimed is:

1. A spectroscope comprising:
a disperser configured to disperse incident signal light, wherein the disperser includes:
a bandpass filter configured to spectroscopically process the signal light by bands, by pivoting according to a driving signal;
a light-receiving element configured to receive the signal light spectroscopically processed by bands to output a corresponding electrical signal;
a mixer that receives the electrical signal from the light-receiving element and the driving signal for pivoting the bandpass filter and mixes the electrical signal and the driving signal;
an electrical filter that outputs a signal of a target band from a signal output from the mixer; and
an amplifier that allows the electrical signal output from the light-receiving element to be amplified and outputs the amplified electrical signal to the mixer,
wherein the mixer performs a down-conversion of the amplified electric signal output from the amplifier using the driving signal for pivoting the bandpass filter.

2. The spectroscope of claim 1, further comprising:
a collimator configured to allow the signal light to be collimated and provided to the disperser.

3. The spectroscope of claim 1, wherein the light-receiving element comprises one or more photodiodes arranged in an array or in a row.

4. The spectroscope of claim 1, wherein the bandpass filter is an interference filter coated with materials having different refractive indices a plurality of times and is configured to allow light in a preset band to be passed by interference.

5. The spectroscope of claim 1, wherein the bandpass filter performs pivotal movement on one of a y-axis and a z-axis perpendicular to an x-axis, which is an optical axis of the signal light, as a pivot axis.

6. The spectroscope of claim 1, wherein, as a pivoting angle of the bandpass filter increases, a wavelength of light output from the bandpass filter decreases.

7. The spectroscope of claim 1, wherein, as the bandpass filter pivots, the bandpass filter is configured to output light dispersed by bands of the signal light, and the light-receiving element is configured to receive dispersed light.

8. A spectroscope comprising:
a disperser configured to disperse incident signal light, wherein the disperser includes:
a diffraction grating configured to spectroscopically process the signal light by bands, by pivoting according to a driving signal;
a light-receiving element configured to receive the signal light spectroscopically processed by bands to output a corresponding electrical signal;
a mixer that receives the electrical signal from the light-receiving element and the driving signal for pivoting the bandpass filter and mixes the electrical signal and the driving signal;
an electrical filter that outputs a signal of a target band from a signal output from the mixer; and
an amplifier that allows the electrical signal output from the light-receiving element to be amplified and outputs the amplified electrical signal to the mixer,
wherein the mixer performs a down-conversion of the amplified electric signal output from the amplifier using the driving signal for pivoting the bandpass filter.

9. The spectroscope of claim 8, further comprising:
a collimator configured to allow the signal light to be collimated and provided to the disperser.

10. The spectroscope of claim 8, wherein the light-receiving element comprises one or more photodiodes arranged in an array.

11. The spectroscope of claim 8, wherein the diffraction grating comprises a plurality of grating patterns provided in any one direction.

12. The spectroscope of claim 8, wherein the disperser is configured to disperse and output light of all bands included in the signal light.

13. The spectroscope of claim 8, wherein the light-receiving element is configured to receive dispersed light.

14. The spectroscope of claim 8, wherein the diffraction grating is configured to perform pivotal movement in a direction parallel to a grating pattern direction.

15. The spectroscope of claim 1, wherein the output signal from the mixer is a sum of a signal having a frequency component corresponding to a frequency difference between the output signal from the amplifier and the driving signal, and a signal having a frequency component corresponding to a sum of the frequencies of the output signal from the amplifier and the driving signal.

16. The spectroscope of claim 8, wherein the output signal from the mixer is a sum of a signal having a frequency component corresponding to a frequency difference between the output signal from the amplifier and the driving signal, and a signal having a frequency component corresponding to a sum of the frequencies of the output signal from the amplifier and the driving signal.

\* \* \* \* \*